(12) United States Patent
Anand et al.

(10) Patent No.: US 9,542,854 B2
(45) Date of Patent: Jan. 10, 2017

(54) REVERSE-MULTIPLE CHOICE METHOD FOR KNOWLEDGE ENGINEERING AND EXPERT SYSTEM IMPLEMENTATION

(71) Applicants: Indu M. Anand, Chelmsford, MA (US); Pranav Anand, Santa Cruz, CA (US)

(72) Inventors: Indu M. Anand, Chelmsford, MA (US); Pranav Anand, Santa Cruz, CA (US)

( * ) Notice: Subject to any disclaimer, the term of this patent is extended or adjusted under 35 U.S.C. 154(b) by 0 days.

(21) Appl. No.: 15/041,992

(22) Filed: Feb. 11, 2016

(65) Prior Publication Data

US 2016/0163215 A1  Jun. 9, 2016

Related U.S. Application Data

(63) Continuation-in-part of application No. 13/457,440, filed on Apr. 26, 2012, which is a continuation-in-part of application No. 11/350,266, filed on Feb. 7, 2006, now Pat. No. 8,195,085, which is a continuation-in-part of application No. 09/951,132, filed on Sep. 12, 2001, now Pat. No. 7,033,182.

(60) Provisional application No. 60/232,110, filed on Sep. 11, 2000.

(51) Int. Cl.
| | |
|---|---|
| *G09B 7/02* | (2006.01) |
| *G06N 99/00* | (2010.01) |
| *G06F 17/30* | (2006.01) |
| *G09B 7/06* | (2006.01) |
| *G09B 7/08* | (2006.01) |

(52) U.S. Cl.
CPC ........... *G09B 7/02* (2013.01); *G06F 17/30424* (2013.01); *G06N 99/005* (2013.01); *G09B 7/06* (2013.01); *G09B 7/08* (2013.01)

(58) Field of Classification Search
USPC ........................................................ 434/353
See application file for complete search history.

*Primary Examiner* — James Hull
(74) *Attorney, Agent, or Firm* — Wolf, Greenfield & Sacks, P.C.

(57) ABSTRACT

A system and method of communication based on the Reverse Multiple-Choice Method of teaching and testing is disclosed where at least one communicant is a machine. The method is applicable for training a machine for knowledge engineering and artificial intelligence oriented applications, as well as for a trained machine to assist a human being engaged in the activity of teaching or testing.

11 Claims, 1 Drawing Sheet

Illustration of RMCM in knowledge acquisition

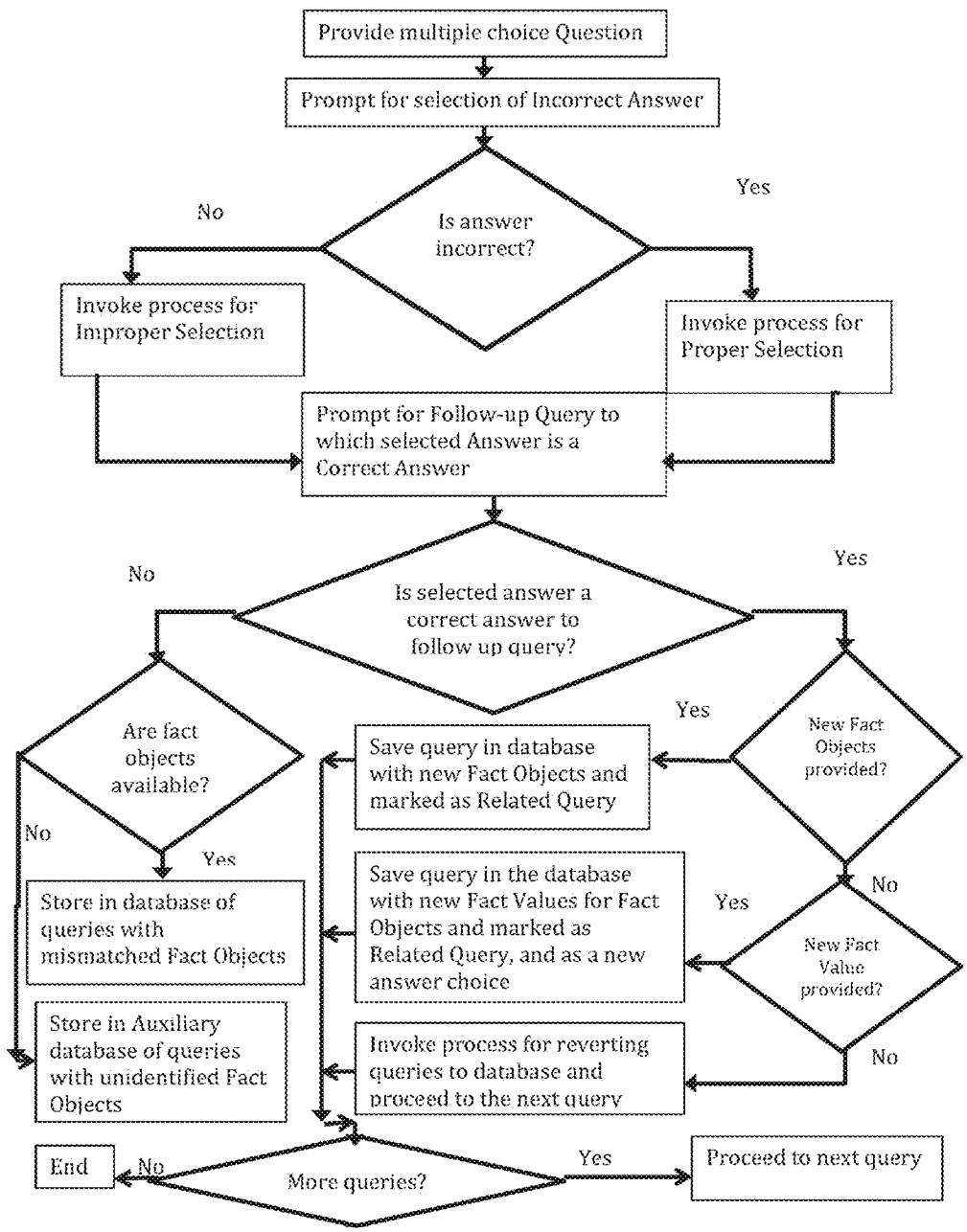
Illustration of RMCM in knowledge acquisition

REVERSE-MULTIPLE CHOICE METHOD FOR KNOWLEDGE ENGINEERING AND EXPERT SYSTEM IMPLEMENTATION

CROSS-REFERENCE TO RELATED APPLICATIONS

This application is continuation-in-part of U.S. patent application Ser. No. 13/457,440, filed on Apr. 26, 2012, which was continuation-in-part of U.S. patent application Ser. No. 11/350,266, filed Feb. 7, 2006, now U.S. Pat. No. 8,195,085, which claimed the benefit of U.S. patent application Ser. No. 09/951,132, filed on Sep. 12, 2001, now U.S. Pat. No. 7,033,182, which claims the benefit of U.S. Provisional Patent Application Ser. No. 60/232,110, filed Sep. 11, 2000. The subject matter of this application is also related to PCT Application No. PCT/US2007/003127 filed on Feb. 6, 2007, which gave rise to Patent No. 2007212424 in Australia and Patent No. 4993773 in Japan.

The entire contents of Patents No. U.S. Pat. No. 7,033,182 and U.S. Pat. No. 8,195,095, and application Ser. No. 13/457,440, Ser. No. 11/350,266, Ser. No. 09/951,132 as well as Provisional Application Ser. No. 60/232,110 are hereby incorporated by reference.

FIELD OF THE INVENTION

The present invention relates to query-based methods of machine learning and the development and use of expert systems, and more specifically extends the Reverse Multiple-choice Method of teaching and testing to machine learning and knowledge engineering.

BACKGROUND OF THE INVENTION

Frederick J. Kelly invented multiple-choice question (MCQ) format in 1914, primarily to democratize education and wring out bias from student evaluation. Hence the alternative monikers "Objective," or "standardized" have been used for MCQs. While the colleges of Kelley's day were slow to adopt it, multiple-choice is now the world's most commonly employed testing format. Its use has grown even more rapidly since the advent of computerized tests, especially for examinations involving large numbers of students, presumably because MCQs lend themselves readily to automation.

In the last one hundred years multiple-choice format has essentially remained the same, despite its ubiquity and widely recognized shortcomings. A key reason for its popularity, it is safe to say, is this possibility of automation, from which flow the other advantages, such as, objectivity, uniformity and scalability of testing and grading. Open format, long or short essays are no match for MCQ format, as they are notoriously subjective, non-uniform and non-scalable, hence expensive to administer. The Reverse Multiple-choice Method was devised by one of the present inventors to address some of the shortcomings of multiple-choice testing format.

Multiple-choice questions remain a common way of testing students in virtually all subject areas, particularly in examinations taken by large numbers of students. In its most commonly used form, a multiple-choice question comprises three identifiable sections: a section containing a set of facts to be presumed, an interrogative sentence, and a set of answer choices. Together, the first and the second section, may be referenced as a "query." A student generally answers an MCQ by indicating the answer selection from the given answer choices. Whether the test is conducted on a computer or paper, grading can be automated or carried out nearly automatically.

By now, however, the long experience with multiple-choice tests in many academic settings has shown that these advantages of MCQs can turn into its disadvantages: The very ease and simplicity of selecting and recording an answer to a test question blurs the difference between knowledge and ignorance. All that the examinee has to do is click or mark an answer, which is possible to do completely at random with nary an inkling of the subject matter. The probability of scoring a passing grade is very low if an examinee is completely ignorant, but it is possible to improve the scores with a little knowledge and answer guessing techniques. Unlike the open format/essay testing format, a test-taker generally has little scope to actively reveal knowledge in a multiple-choice test, therefore cheating is harder for the examiner to spot when it occurs.

Reverse Multiple-Choice Method ("RMCM") was introduced in U.S. patent application Ser. No. 09/951,132, now U.S. Pat. No. 7,033,182, and extended in patent application Ser. No. 11/266,350, now U.S. Pat. No. 8,195,085. RMCM offers a promising alternative for teaching, training and assessment that may be automated/computerized, and thereby inherits many advantages of multiple-choice format. RMCM technology combines the uniformity, efficiency and grading ease of "objective" or "standardized" multiple-choice tests with the reliable "measure of knowledge and understanding" generally associated with open/long format tests.

The present invention stems from the observation that the advantages of RMCM are not limited to interactions between human teachers/examiners and students/examinees, but that it is possible to adapt and extend RMCM to the case where at least one of the communicants in an interaction, e.g., between teacher/trainer and student/trainee, is a machine. Such extension of RMCM, however, must respect the differences between humans and computerized machines as to the learning capacity and the accumulation, retention, recall of knowledge, as well as the "tacit knowledge" of the application environment. This invention relates to the improvement of RMCM when at least one party to such communication is a machine.

SUMMARY OF THE INVENTION

Multiple-choice questions are a common way of testing students in many subject areas at. In its most commonly used form, a multiple-choice question comprises three identifiable sections: a section containing a set of facts to be presumed (for instance, a narrative, a short story, a poem, an expression, a formula or an equation, or a geometric figure), an interrogative sentence (also known as the "call of the question"), and a set of answer choices. A multiple-choice question can also be thought of consisting of two parts—a first part, comprising a set of facts to be presumed and an interrogative sentence, and a second part, comprising a set of answer choices. The first part may be referenced as a "query" herein. The second part, typically contains between three and five answer choices, one of which may be marked as the correct answer, although the number of answer choices may vary below three or above five under appropriate circumstances. In a computerized version, a student generally selects the answer by marking the corresponding radio-button. But answering can be easy even on a paper-based MCQ: darken the little circle corresponding to the correct answer. Keeping track of the scores is easy on a computer, and paper version can be graded nearly automatically by counting the matches against an answer sheet template.

The Reverse Multiple-Choice Method is more than an assessment format; it is a question and answer type of communication and information exchange. More specifically, it is a method that utilizes multiple-choice questions but with a fundamental change of perspective: RMCM question requires the answerer to: (i) carefully weigh each answer choice of the multiple-choice question in the context of the query, (ii) inquire how the given facts would be different or modified (if necessary) to make an answer choice the "correct" or "best" answer, and (iii) then provide such a modification for at least one "incorrect" answer choice. Prior art involving multiple-choice questions stops at the first step of seeking the correct answer, or possibly at the second step of pointing out the distinctions within the narrative or given facts that make the answer choice correct or incorrect. The last step of systematically requiring the modification of the narrative or given facts to make the incorrect answer become the correct answer for the changed query, however, is a distinguishing feature of RMCM. It is this feature from which several other benefits of the method flow.

The systematic change or modification of the query required in step (iii) of the interaction between two communicants allows RMCM questions and answers to be computerized in all phases, from question creation to question answering to evaluation and scoring of the answer. RMCM starts with the familiar multiple-choice format, but then goes much further by harnessing the power of "wrong" answers; RMCM relies on framing a MCQ so that a question answerer is given a task to not only reveal their reasons for the answer selection but to do so in a brief and succinct manner that may be evaluated and assessed by a computer.

The computerization of all phases of question and answer in the RMCM scheme makes this type of communication particularly suitable when at least one communicant is a machine, such as in machine learning, knowledge acquisition, knowledge engineering or expert system development.

The first step in successfully answering a RMCM question is the identification of the important facts within the query on which the correctness or incorrectness of each answer choice rests. In Reverse Multiple-Choice terminology these important facts are called "Fact Objects." A fact object is a semantic entity which is often, though not universally, expressed in the syntactic construction of the query and it is meaningful in the context of the query and one or more of the answer choices provided. Thus, for instance, it is possible for a phrase to be a (relevant) fact object in the context of one answer choice for a question but not for another answer choice. It is also possible for a word is used in a query narrative multiple times to be a (relevant) fact object only on one of those occasions.

The actual value of a Fact Object relevant to an answer choice is its Fact Value for the answer choice. Akin to the assignment of constant value to a variable in algebra, fact value is an instantiation of a fact object.

Through the "fact object/fact value" constructs and the requirement of the process task "changing the query (of a multiple-choice question) corresponding to an incorrect answer so as to make it a correct answer to the changed query," RMCM offers the structure and methodology to use the answer choices to provide the context for interpretation of the query in terms of given facts, key words, phrases, and concepts as well as in terms of the relationships between them. When RMCM is used for human interactions between teachers/examiners and students/examinees it leads to in-depth communication and assessment. RMCM's structure and methodology also supports improved and more efficient communication when a machine takes either or both of the roles of teacher/trainer or student/trainee.

Machines that can "learn" must demonstrate capability to understand the meaning of natural (human) language to an extent. This could require, for example, that given a form of text (such as, a document, message, narrative, or script) the machine be able to parse the text and generate an instantiated follow-up script that would be regarded as conveying the meaning of the original text at an acceptable level. Other ways to demonstrate the understanding might be similar to the following: recall, not as a regurgitated barrage of the inputs, but as an organized presentation of the text content; high performance on a test; augment its lexical knowledge; consult a resource such as a dictionary to interpret a new script; adaptively respond in a coherent manner to new script.

Machine-based expert systems or "intelligent" systems have the following identifiable components: a knowledge base which represents the compilation of known facts gleaned from several sources (generally external to the system to include "real world" knowledge), possibly including a human expert; an inference engine which includes the rules for operating on the facts either in the knowledge base or new to the system; a database on which the knowledge base and inference engine may operate; and input and output units that allow the system to communicate with a user, in particular to communicate appropriate conclusions in new situations. There may also be interpreter components that explain the reasoning behind the inferences and/or carry out actions based on the conclusions.

In artificial intelligence and natural language processing applications, such as, machine learning/knowledge acquisition/knowledge engineering/expert system development the roles of a machine may include: A machine learning to imbibe the "knowledge" of a human expert; a computerized expert trainer imparting training or knowledge to a human trainee/student; a computerized expert trainer imparting training or knowledge to another machine (e.g. one that has a limited capacity or scope); and so forth. It is widely recognized by the research community now that in situations such as these computers must go beyond their traditional, procedural roles of providing support for data management and number-crunching. RMCM based "artificial" intelligence tools can be especially valuable in appropriate circumstances where the other non Q & A type methods struggle.

Some of the commonly used knowledge based methods include: clustering of text based items according to "similarity" by compiling frequency vectors of index terms; Latent Semantic Indexing which takes advantage of "closeness" of words in a comparison of texts; adaptive techniques based on relevance feedback; preprocessing of texts by category; syntactic categorization; semantic analysis using "fuzzy" logic; or some ordered combination of similar techniques.

Reverse Multiple-Choice based Q & A techniques are compatible with the above mentioned methods, and may be used in addition to one or more of these and other similar approaches for developing intelligent machines. RMCM puts the onus of the learning on the expert to generate well-crafted queries, whether the expert in the learning situation is the human or the machine.

RMCM based Q & A is a tool of significantly greater applicability than traditional multiple-choice, which basically is only an assessment technique; RMCM is a method of communication and precise information exchange effected through its step of requesting, receiving and processing query modification according to task given by one communicant to the other communicant, which may be a human or a machine.

It is important to appreciate that such communication is generally not possible using even a set of similar, related multiple-choice questions because regardless of the number of related questions, traditional MCQs would normally require clicks or check marks for answer selection (all of which are possible to do at random), whereas RMCM requires a concise answer to be supplied.

Furthermore, loosely related multiple-choice questions may provide an insight into the communicants' reasoning in some cases, but on an ad hoc, non-systematic way. The relationship between such questions, therefore, could be lost on the interacting communicants. The relationships, comparison and contrast between the answer choices, on the other hand, are a focal point of RMCM and less likely to be overlooked.

Additionally, RMCM deals systematically with related answer choices since they pertain to the same (query) stem. The benefit of computerization of the entire question cycle, from creation, answering and grading to maintenance of the scores for carefully crafted RMCM questions can lead to new ways of data collection and analysis, and meaningful categorization of data into related clusters.

With its step of modifying a query as needed, RMCM provides a concrete mechanism for using and correcting errors and misconceptions in communication; that mechanism can be used to minimize or eliminate the errors in communication between humans and machines when suitable. Thus the method may be used effectively for validation of the information exchange.

RMCM methodology can also be used as a means to ensure that machine learning or training is reliable. Therefore, the method can contribute to the development of robust knowledge base and sound reasoning, and improve the art of expert system development.

BRIEF DESCRIPTION OF DRAWINGS

FIG. 1, reproduced from the parent application Ser. No. 13/457,440, provides an illustration of RMCM in a knowledge acquisition application.

DETAILED DESCRIPTION

Multiple-choice Format

Multiple-choice format for questioning and answering has been used across the globe for academic testing for many decades. Despite the drawbacks of the format, well-recognized in the educational testing industry, MCQs remain a common way of testing students in a variety of subject areas, particularly in examinations taken by large numbers of students.

In its most commonly used form, a multiple-choice question comprises three identifiable sections: a section containing a set of facts to be presumed (for instance, a narrative, a short story, a poem, an expression, an equation, or a geometric figure), an interrogative sentence (sometimes known as the "call of the question"), and a set of answer choices. A multiple-choice question can also be thought of consisting of two parts—a first part, comprising a set of facts to be presumed and an interrogative sentence, and a second part, comprising a set of answer choices. The first part may be referenced as a "query" herein. The second part, typically contains between three and five answer choices, one of which may be marked as the correct answer, although the number of answer choices may vary below three or above five under appropriate circumstances. In a computerized version of MCQ test, a student generally selects the answer to a question by marking the corresponding radio-button. But answering can be easy even on a paper-based MCQ: darken the little circle corresponding to the correct answer. Keeping track of the test scores is easy on a computer, and the paper version can be graded nearly automatically by counting the matches against an answer sheet template.

Reverse Multiple-choice Method

Reverse Multiple-choice Method was invented to mitigate the drawbacks while keeping the major advantages of traditional multiple-choice for testing of academic students. RMCM has unique strengths when a computerized machine is deployed in the role of a trainer or a trainee, since the method provides a structure and process of communication based on brief, concise computer-implementable interactions capable of insightful information exchange, which is especially valuable when the communication involves at least one machine.

As mentioned above, Reverse Multiple-choice Method starts with multiple-choice questions. An RMCM question requires the answerer to: (i) carefully weigh each answer choice of the multiple-choice question in the context of the query, (ii) inquire how the given facts would be different or modified (if necessary) to make an answer choice the "correct" or "best" answer, and (iii) then provide a modification of the query for at least one "incorrect" answer choice so that the incorrect answer becomes the correct answer for the modified query.

Artificial Intelligence, Machine Learning and Related Knowledge Fields

The field of expert systems or knowledge engineering is identified in the literature by several names—its key characteristics being the existence within the system of the following identifiable components: (i) a knowledge base which represents the compilation of known facts gleaned from several sources (generally external to the system to include "real world" knowledge), possibly including a human expert; (ii) an inference engine which includes the rules for operating on the facts either in the knowledge base or new to the system; (iii) a database on which the knowledge base and inference engine may operate, in particular to draw and communicate appropriate conclusions in new situations; and, (iv) input and output units that allow the system to communicate with a user. There may also be interpreter components that explain the reasoning behind the inferences and/or carry out actions based on the conclusions. Most of the functions of the system depend on the machine's "learning" the facts and the rules from a "dialogue" between the machine and a human expert. In one form or another, this relies on presenting or finding answers to queries presented.

The endeavors such as machine learning, expert systems, knowledge acquisition, knowledge engineering, artificial intelligence and decision support systems etc. involve a discourse between the "Transferor" and the "Transferee" of knowledge, and this transfer of information and dialogue can be carried out with clarity in the form of questioning and answering. Furthermore, the roles of questioner and answerer in these applications may alternate between the transferor and the transferee of information. RMCM can support the shifting roles, and presents novel ways of organizing the information and deriving new insights from it.

Novel Use by RMCM of Unique Advantages of Multiple-choice

Although the advantages such as the uniformity of administering and the ease of grading multiple-choice tests in the academic, or similar settings, are universally recognized, there are other advantages of this user-friendly format, which had neither been cited nor exploited over the many decades of its use, growth, extolling and maligning. The present inventors used those inherent and exceptional advantages to fashion the Reverse Multiple-choice Method for teaching and testing in the earlier filed and patented applications, and retool RMCM for applications involving interaction with and between computerized machines.

More than simply an assessment technique, RMCM is a method of communication in which information exchange can be concise, controlled, fully computer implementable and applicable in situations where "Question & Answer" interactions can be used. Knowledge acquisition readily comes to mind, but other fields such as machine learning, expert systems, knowledge engineering, artificial intelligence and decision support systems etc. all involve a discourse between the "Transferor" and the "Transferee" of knowledge; this transfer of information through a dialogue can be carried out with clarity in the form of questioning and answering. Furthermore, the roles of questioner and answerer in these applications may often alternate between the transferor and the transferee of information. Reverse Multiple-choice Method brings a unique set of advantages to these such applications.

It is often noted that a well-constructed multiple-choice question can be honed into an incisive tool that requires thought and analysis for the selection of the correct answer out of the various "confounding" answer choices. To the extent that an answer choice can be rejected on cursory inspection, it represents a "lost" opportunity for discrimination and evaluation. On the other hand, if due to a "small" difference in the narrative or the call of the question, correct and incorrect answers trade places, then the value of the question is higher in a meaningful information exchange.

In a well-constructed multiple-choice question with k answer choices, the questioner may delve deeper into a topic than in a set of k unrelated questions, since the k answer choices all relate to the same narrative. This allows for the subject matter of the question to be potentially viewed and reviewed from k perspectives, akin to locating a data point in a k-dimension space.

Traditional multiple-choice method of questioning, asking only for the correct answer, discards most of that dimensional freedom. Reverse Multiple-Choice Method, however, exploits the power of the incorrect answers and all k degrees of freedom. Although certain traditional MCQs may permit a comparable level of evaluative depth by suitable follow-up questions, there is no systematic way to do so. The structure and methodology of RMCM, on the other hand allows use of the k degrees of freedom to interpret the query and transmit information with greater clarity.

RMCM's flexible format admits short, structured answers by the answerers in the form of modified queries. By asking the answerer to construct new queries corresponding to the incorrect answers, it is possible to generate Q & A families or clusters, that can possibly impart "real world" knowledge to machines, similar in a way to the manner in which a baby acquires real world knowledge by repeatedly asking questions. Thus, RMCM's native structure may enable grouping of questions into clusters related by common concepts or processes; those clusters may themselves be grouped into "superclusters" further organized by concepts or processes. The distinctions of RMCM from standard MCQs can prove more important in a dialogue that involves a machine as a party to the communication.

In a RMCM question the many degrees of freedom are resolved by the answer choices that limit the lexical universe of the question, as it were.

Fact Objects in RMCM, Information Context and Knowledge Primitives in AI

A Fact Object of a multiple-choice question is defined to include any object, word, element, number, operator symbol, phrase, or a group of words, elements, numbers, operators, symbols, or other objects, or any other type of entity capable of holding information. A fact object denotes a fact, datum or piece of information in the first part of a multiple-choice question that may be considered when interpreting the answer choices or choosing an answer choice to the question. For instance, in a question asking for the calculation of the volume of a box having sides of 1 foot, 2 feet and 3 feet, the length of each side may be considered a fact object. If, however, the height of the box is 3 feet and the question requires calculation of the area of the base then the height (3 feet) is not a fact object since it is not relevant to area of the base. In a question on an art history exam, there may be a single fact object—the piece of artwork presented—and the interrogative sentence may ask the answerer to consider answer choices relating to the work to select the "correct" answer choice. Where a particular fact, datum or piece of information is contained in or conveyed by a phrase or a group of words, elements, numbers, operators, symbols, or other objects or entities, the whole of such phrase or group is the fact object.

The significance of a fact object derives from the context of the query and the set of answer choices of a particular multiple-choice question.

The reason an answer choice of an MCQ is either correct or incorrect has to depend on an identifiable part of the question, whether it is explicit segments of the narrative or an implicit requirement inherent in the query. Thus, the multiple answer choices of the question make possible the identification of the "key" concepts in the query. Reverse Multiple-Choice Method as used in the present invention provides a method of quite naturally arriving at the key concepts by seeking "Fact Objects" (FO's) corresponding to each answer choice. And, since identification of the key concepts in a query string is an important objective of a machine's "learning," RMCM's explicit construct of "Fact Objects" quite naturally corresponds to the tacit "concepts" in the question.

Fact objects can similarly correspond to other "knowledge primitives," such as attributes or properties of concepts, relations between concepts and so forth, if correctness or incorrectness of one or more answer choices depends on those primitives.

The Fact Value construct in RMCM is an instantiation of Fact Object for an answer choice; it is the actual value that a Fact Object relevant to the answer choice takes to make the answer choice correct. Fact Objects and Fact Values are semantic entities which are expressed in syntactic terms in a query.

EXAMPLE 1

Fact Object/Fact Value Constructs in RMCM

Divide and simplify the expression:

$$\sqrt{(10)} \div \sqrt{2} = (A)\sqrt{8} \quad (B)2\sqrt{2} \quad (C)\sqrt{5} \quad (D)2\sqrt{5} \quad (E)2\sqrt{3}$$

The Correct answer is (C). Answers (A) and (B) are different forms of the same incorrect answer, which may catch the non-alert student. Here RMCM would task the student to "modify the question suitably to make one or more of incorrect answers correct for the changed question." Thus, the incorrect answer:
- (A) would be correct if we: change the division "÷" to a subtraction "−" and drop the second square root operation "√" as well as extend the first "√" to cover both the numbers;
- (B) would be correct if we: change the "÷" to a "−", drop the second square root operation "√" and extend the first "√" to cover both the numbers;
- (D) would be correct if we: change the division "÷" to "*" a multiplication; and
- (E) would be correct if we: change the division "÷" to an addition "+" and drop the second square root operation "√" as well as extend the first "√" to cover both the numbers.

Therefore, the list of segments/syntactic elements, i.e., fact objects for Example 1 is: the first √, the first paren (, the first number, the second paren), the arithmetic operation, the second √, the second number. These facts are tabulated in Table 1. Other related tables may be maintained by the system, for example, the illustrative Table 2 for evaluative purposes showing fact objects/fact values for answer choices with a (fictitious) score breakdown.

The score in Table 2 are score may be a probabilistic number showing the relative significance of the fact objects and the fact values. In the case of a human training a machine, these percentages could refer, for example, to the time that the machine would require to fetch the answers from the databases accessible to it; in the case of a machine training a human, they could refer to the number of correct responses required for the trainee to advance to the next level; in the case of a machine imparting knowledge to another computerized machine (for example a satellite in a network) that does not have access to the original database, they may relate to the time that the trainer machine should spend on emphasizing the concept; and so on.

TABLE 1

Fact Object/Fact Value Table for Example 1

| Fact Object | Ans. choice | Fact Value | comments |
|---|---|---|---|
| [the first square root], √ | | | No change for any answer |
| [the first half paren], ( | | | No change for any answer |
| [the first number] | | | No change for any answer |
| [the second half paren], ) | (A) | (M, move symbol to location after second number) | |
| | (B) | (M, move symbol to location after second number) | |
| | (E) | (M, move symbol to location after second number) | |
| [arithmetic operation] | (A) | − [subtraction] | |
| | (B) | − [subtraction] | |
| | (D) | * [multiplication] | |
| | (E) | + [addition] | |
| [the second square root ], √ | (A) | (D, delete symbol) | |
| | (B) | (D, delete symbol) | |
| | (E) | (D, delete symbol) | |
| [the second number] | | | No change for any answer |

TABLE 2

Answer choice/Fact Object/Fact Value/Scoring

| Ans. Choice | Fact Object | FO selection score | Fact Value | FV selection score | comments |
|---|---|---|---|---|---|
| (A) | [the second half paren], ) | 25% | (M, move to location after second number) | 30% | |
| | [arithmetic operation] | 50% | − [subtraction] | 40% | |
| | [the second square root ], √ | 25% | (D, delete symbol) | 30% | |
| (B) | [the second half paren], ) | 25% | (M, move to location after second number) | 30% | |
| | [arithmetic operation] | 50% | − [subtraction] | 40% | |
| | [the second square root ], √ | 25% | (D, delete symbol) | 30% | |
| (D) | [arithmetic operation] | 100% | * [multiplication] | 100% | |
| (E) | [the second half paren], ) | 25% | (M, move to location after second number) | 30% | |
| | [arithmetic operation] | 50% | + [addition] | 40% | |
| | [the second square root ], √ | 25% | (D, delete symbol) | 30% | |

Use of RMCM Process for Artificial Intelligence Applications

RMCM for educational testing comprises the steps of: (a) providing one or more multiple-choice questions, each question comprising a query and a plurality of answer choices, wherein said plurality of answer choices comprises one correct answer and one or more incorrect answers; (b) prompting the examinee to select an answer choice as the correct answer; (c) maintaining a record of the examinee's selection in step (b); (d) assigning credit for the examinee's selection of an answer in step (b) according to a preset formula; (e) prompting the examinee to select at least one of said plurality of answer choices not selected in step (b); (f) prompting the examinee to provide a follow-up query to which the answer choice selected in step (e) is a correct answer; (g) maintaining a record of the examinee's answer in step (e); (h) assigning credit for the examinee's selection of an answer in step (e) according to a second preset formula; (i) combining the credit generated in steps (d) and (h) into a score for the question according to a third preset formula; (j) evaluating the score, e.g., against a preset standard.

This method will be suitably adapted where a machine is involved in the communication, for example, as either the provider or the recipient of knowledge. In the case where a knowledge database is being created into a machine via questions and answers, by either a human or a machine trainer, for instance, the machine may be prompted in step (b) to generate the correct answer from its databases for validation. The step (d) of assigning credit for this step may refer to the probability of success for questions similar to the ones asked. Also, "assigning credit" steps (d), (h), (i) and (j) may related to different evaluation parameters, such as success rate, time for the response, associate weightage in accordance with statistical or probabilistic models corresponding to the given answer choices or to the facts on which the answers turn, etc.

EXAMPLE 2

A Method of Training a Machine by a Human Expert

The flow diagram of FIG. 1 displays a session such as the one that follows below.

The following is an illustrative session of RMCM based training dialogue between Human Expert, H, and Machine expert-under-construction, M, wherein a Fact Value (FV) is an instantiation of a Fact Object (FO), case defines a question and a dialogue below is expected to loop iteratively as many times as decided by H:

(i) User U defines a case. (U may be=H)
(ii) H creates or displays a previously created multiple-choice question Q based on case narrative—Answer Choices (ACs), Fact Objects (FOs), Fact Values (FVs)
(iii) Q is stored in database if a new question
(iv) U asks M to "scan" question
(v) U asks M for an answer
(vi) M encounters a FO, recalls Q
(vii) M matches FOs sequentially
(viii) IF a match, M matches FVs sequentially
  a. IF an FV match, M produces for U an answer choice
  b. ELSE M requests RMCM answer "correction" from H, records FV(s) for correction
  c. M compares query created in step (ii) with "corrected" query
  d. M asks H if corrected query should be saved as new answer choice alternative
    i. If yes, M saves corrected query as new answer choice alternative
    ii. If no, M saves corrected query as new related case
(ix) IF not an FO match,
  a. M requests RMCM answer "correction" from H, records FO(s) for correction
  b. M compares query created in step (ii) with "corrected" query
  c. M saves corrected query as related new case, if at least one FO match
  d. Else, M saves corrected query as unrelated new case.

One may also note that:
(A) System may compute and assign probabilities of case scenarios via FV and FO probabilities
(B) M may be refined by assigning and incorporating probabilities of case scenarios
(C) The roles of H and M are interchangeable;
(D) Either H or M may also be the user U
(E) For each question in the database, there are: Query+{AC, FOs, FVs} where AC stands for answer choice, FO for fact object and FV for fact value, {AC, FOs, FVs} is the set of an answer choice and its related fact objects and corresponding fact values, and +denotes direct sum of such sets for all answer choices; each FO has a truth value (T or F) corresponding to each AC; each FO that has the truth value T (relevant) for the AC has an associated FV; each FO with truth value F has no FV associated with it.
(F) When M gets an incorrect AC, M records that fact in database as well: Query+AC.about., where AC.about. is the incorrect answer choice
(G) When M produces an incorrect AC as answer, rejected by H, M records that fact as well as Query+AC.about.
(H) When H produces an incorrect AC as answer, rejected by M, M records that fact as well as Query+AC.about.
(I) When new Answer is presented, M matches it against all ACs and against all instances of AC.about to present or generate an answer
(J) When new query presented, M matches query against all stored queries to present or generate an answer.

Other variations of this method of training based on the RMCM methodology are contemplated to be within the scope of this invention. For example, the training of the machine may be conducted by a group of experts, including humans and other machines with appropriate expertise.

Such sessions used sequentially will generate the Knowledge Base, made up of clusters or families of questions, such that questions within a cluster may be related. The organization of the knowledge base as related clusters is useful when a new set of conditionals are presented to the machine.

Expert System Development

The algorithms of artificial intelligence/expert systems typically ask the machine to return an answer by "pruning the logic tree" that the machine has constructed from the training when a new conditional is presented. It then follows all branches of the tree until they fail, chaining backward along a branch that failed to ascend and consider a new branch.

The RMCM based method outlined above, includes graph-theoretic components and does not entirely depend on the tree structure. This approach ensures that all related conditionals are available for consideration and that the logic tree is not pruned prematurely losing a branch of analysis that might have proved useful.

RMCM may generate domain-aware query clusters that are generally not available by other methods typically used in the machine learning environments. In many machine learning applications one is faced with a high volume of information necessitating the pruning of some branches to analyze the most promising line of reasoning. If it becomes apparent that the line of reasoning being followed is not the most promising one then it becomes necessary to follow the backward chain of reasoning. However, this method of forward and backward can be inefficient if the error in reasoning is uncovered far down the stream.

Other clustering methods have been proposed in the literature, but RMCM has the potential as a flexible, general purpose method of clustering that minimizes the need for backward chaining. The reason for this is that RMCM depends on clusters of queries whose mutual dependency may be linked via fact objects and related and analyzed via graph-theoretic considerations.

A Role for Expert Machine and System

It is anticipated that a computerized machine that has been trained to recognize the relationship between the questions and answers in a particular subject matter will acquire the capability to suggest a short list of new queries along with their relative merits to the human examiner by intelligently searching its database of queries.

An "expert" machine may eventually also "write" queries for possible acceptance by a human examiner. The methodology for the machine to write such queries will often rely on the clustering mechanisms built into the RMCM system.

FIG. 1 illustrates how clusters of closely related queries may be formed by employing the mechanism of Fact Values, and the higher level clusters of related queries via Fact Objects. FIG. 1 also shows that unrelated queries are not discarded but rather stored in other auxiliary databases, such as, the database for mismatched fact objects or the database for unidentified fact objects, for recall later if a completely new situation presents.

Having now described a few illustrative embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

The invention claimed is:

1. A method of knowledge engineering and building knowledge to a local or remote computerized machine by a human training operator by using one or more multiple-choice questions, wherein the method comprises constructing databases organized for efficiency of recall and processing, and loss-free, persistent storage of items of contextually-related information, and wherein the method comprises steps of:
   (a) providing by said human training operator to said computerized machine one of said one or more multiple-choice questions, the provided multiple-choice question including a given query and one correct answer and one or more incorrect answers to the given query;
   (b) adding the provided multiple-choice question to a database of questions accessible to said computerized machine if the question is not in said database;
   (c) producing by said computerized machine, in response to a prompting command by said human training operator, one of said one or more incorrect answers by accessing information about said multiple-choice question from all databases accessible to said computerized machine, wherein the accessed information includes tables of fact objects and fact values for said multiple-choice question;
   (d) identifying, by said computerized machine, by using the accessed information, one or more fact objects or one or more fact values in said given query that make the answer produced by the computerized machine incorrect for said given query;
   (e) generating, by said computerized machine, in response to a prompting command by said human training operator, by using the accessed information and preset rules, a follow-up query to which the produced incorrect answer is a correct answer, wherein generating the follow-up query comprises changing the identified one or more fact objects or the identified one or more fact values in said given query;
   (f) determining by said human training operator whether the answer produced by the computerized machine is a correct answer to the follow-up query, wherein said determining includes comparing and finding whether the follow-up query matches a query stored in one or more local or remote databases of queries available to the human training operator;
   (g) displaying by said computerized machine for said human training operator any fact objects not in the databases accessible to the computerized machine when it is determined by said human training operator that the follow-up query does not match any of the queries stored in said one or more databases of queries;
   (h) displaying by said computerized machine for said human training operator any fact values not in the databases accessible to the computerized machine when it is determined by said human training operator that the follow-up query does not match any of the queries stored in said one or more databases of queries;
   (i) determining by said human training operator which of said databases accessible to the computerized machine need augmentation based on said displaying by the computerized machine in steps (g) and (h);
   (j) augmenting, based on said determining by the human training operator in step (i), the databases accessible to said computerized machine by storing in one or more of the databases said fact objects not in the databases accessible to the computerized machine or storing in one or more of the databases said fact values not in the databases accessible to the computerized machine, including databases of unidentified or mismatched fact objects;
   (k) augmenting the one or more local or remote databases of queries accessible to said computerized machine by storing said follow-up query in one or more of said one or more local or remote databases of queries when it is determined that the follow-up query does not match any of the queries stored in said one or more databases of queries;
   (l) identifying, by the human training operator or said computerized machine, one or more of the one or more local or remote databases of queries in which to store said follow up query when the follow-up query matches a query stored in said one or more databases of queries; and
   (m) storing said follow up query in said one or more local or remote databases identified in step (l).

2. The method of claim 1, wherein changing one or more fact objects comprises selecting at least one fact object from a given list.

3. The method of claim 1, wherein changing one or more fact values comprises selecting at least one fact value from a given list.

4. The method of claim 1 for generating a cluster of contextually related queries wherein one or more fact objects of said contextually related queries in said cluster are identical.

5. The method of claim 1 for generating a cluster of contextually related queries wherein one or more fact values of said contextually related queries in said cluster are identical.

6. A method of knowledge engineering and building knowledge databases by a first computerized system of a second computerized machine, wherein the first computerized system is communicatively or operationally connected to first one or more local or remote databases of queries which may be distinct from second local or remote databases of queries communicatively or operationally accessible to the second computerized machine, wherein the method comprises steps of:
- (a) providing by said first computerized system to said second computerized machine, a multiple-choice question comprising a given query and one correct answer and one or more incorrect answers;
- (b) adding the multiple choice question to a database of questions accessible to said second computerized machine if the question is not in said database;
- (c) producing by said second computerized machine in response to a prompting command by said computerized system, one of said one or more incorrect answers by accessing information about said multiple-choice question from all databases accessible to the second computerized machine, wherein the accessed information includes tables of fact objects and fact values for said given query;
- (d) identifying by said second computerized machine using the accessed information, one or more fact objects or one or more fact values for said given query that makes the answer produced by the second computerized machine incorrect for said given query;
- (e) generating by said second computerized machine, on command, by using the accessed information and pre-set rules, a follow-up query to which the produced incorrect answer is a correct answer, wherein generating the follow-up query comprises changing the identified one or more fact objects or the identified one or more fact values in said given query;
- (f) determining, by said first computerized system, whether the follow-up query matches a query stored in said first one or more local or remote databases of queries by comparing said follow-up query to queries stored in said first one or more local or remote databases of queries; and
- (g) augmenting said second one or more local or remote databases of queries accessible to said second computerized machine by storing said follow-up query in one or more of said second one or more local or remote databases of when it is determined that the follow-up query does not match any of the queries stored in said second one or more local or remote databases of queries accessible to said second computerized machine.

7. The method of claim 6, further comprising steps of:
- (h) identifying, based on a result of the comparing, one or more databases accessible to said second computerized machine in which said follow up query is to be stored if the follow-up query matches a query stored in said one or more databases of queries accessible to the second computerized machine; and
- (i) storing said follow up query in said one or more databases identified in step (h).

8. The method of claim 6, wherein changing one or more fact objects comprises selecting at least one fact object from a given list.

9. The method of claim 6, wherein changing one or more fact values comprises selecting at least one fact value from a given list.

10. The method of claim 6 for generating a cluster of contextually related queries wherein one or more fact objects of said contextually related queries in said cluster are identical.

11. The method of claim 6 for generating a cluster of contextually related queries wherein one or more fact values of said contextually related queries in said cluster are identical.

* * * * *